United States Patent [19]

Künzer et al.

[11] Patent Number: 4,852,429
[45] Date of Patent: Aug. 1, 1989

[54] METHOD AND APPARATUS FOR CONTROLLING THE STEPLESSLY VARIABLE TRANSMISSION RATIO OF A CONTINUOUSLY VARIABLE TRANSMISSION, ESPECIALLY OF A CONE DISK BELT TRANSMISSION, IN A MOTOR VEHICLE

[75] Inventors: Adolf Künzer, Remshalden; Thomas Klaiber, Stuttgart, both of Fed. Rep. of Germany

[73] Assignee: Daimler-Benz Aktiengessellschaft, Stuttgart, Fed. Rep. of Germany

[21] Appl. No.: 110,866

[22] Filed: Oct. 21, 1987

[30] Foreign Application Priority Data

Oct. 25, 1986 [DE] Fed. Rep. of Germany ....... 3636463

[51] Int. Cl.⁴ .............................................. B60K 41/14
[52] U.S. Cl. .................................... 74/866; 364/424.1
[58] Field of Search ................ 74/866, 862; 364/424.1

[56] References Cited

U.S. PATENT DOCUMENTS

| | | | |
|---|---|---|---|
| 4,253,347 | 3/1981 | Mizuno et al. | 74/862 |
| 4,261,229 | 4/1981 | Mizuno et al. | 74/862 |
| 4,515,040 | 5/1985 | Takeuchi et al. | 74/866 |
| 4,584,907 | 4/1986 | Niwa et al. | 74/862 X |
| 4,649,486 | 3/1987 | Oshiage | 74/866 X |
| 4,663,990 | 5/1987 | Itoh et al. | 74/866 |
| 4,663,991 | 5/1987 | Nakamura et al. | 74/866 X |

FOREIGN PATENT DOCUMENTS

| | | | |
|---|---|---|---|
| 0111854 | 6/1984 | European Pat. Off. | 364/424.1 |
| 0111891 | 6/1984 | European Pat. Off. | 74/866 |
| 0127082 | 12/1984 | European Pat. Off. | 74/866 |
| 2124024 | 6/1982 | Fed. Rep. of Germany . | |
| 3307629 | 9/1984 | Fed. Rep. of Germany . | |
| 3504763 | 10/1985 | Fed. Rep. of Germany . | |

Primary Examiner—Leslie A. Braun
Assistant Examiner—Harold F. Macris
Attorney, Agent, or Firm—Barnes & Thornburg

[57] ABSTRACT

A method and apparatus for the control of the continuously variable transmission ratio of a cone disk belt transmission in a motor vehicle with internal combustion engine, in which changes of the engine rotational speed are guided from actual to desired value specified by the drive pedal during the corresponding transmission change along a rotational speed change desired specified characteristic curve.

22 Claims, 3 Drawing Sheets

METHOD AND APPARATUS FOR CONTROLLING THE STEPLESSLY VARIABLE TRANSMISSION RATIO OF A CONTINUOUSLY VARIABLE TRANSMISSION, ESPECIALLY OF A CONE DISK BELT TRANSMISSION, IN A MOTOR VEHICLE

BACKGROUND AND SUMMARY OF THE INVENTION

The present invention relates to a method and apparatus for controlling the steplessly variable transmission ratio of a continuously variable transmission, especially of a cone disk belt transmission in a motor vehicle, in which desired values are specified to a power output control device of the driving engine by means of a drive pedal, in which desired rotational speed values dependent on the position of the drive pedal are compared in a control apparatus with the actual rotational speed values of the driving engine and in which, dependent on the difference of the two rotational speed values, a rapid change of the transmission ratio is activated by the control apparatus by way of an adjusting mechanism in case of a large difference and a slower change of the transmission ratio is activated in case of a difference of the two rotational speed values which becomes smaller, whereby the change of the transmission ratio is terminated with a disappearing difference.

A method and apparatus of the aforementioned type can be ascertained from the operation of a control arrangement for a cone disk belt transmission as disclosed in the DE-OS 35 04 763.

This method is based on a regulation of the engine rotational speed to desired values specified by the drive pedal of the motor vehicle by adjustment of the split cone disks of the stepless transmission.

The regulating deviation is thereby dependent on the desired rotational speed values and measured actual rotational speed values of the combustion engine or on the transmission input shaft and of further measured values.

It has been found that with such an engine rotational speed regulation, transitions from one engine rotational speed to another, for example, for the acceleration of the vehicle, whereby the desired rotational speed specification is raised suddenly by the drive pedal, is terminated as a rule only after an over-shooting of the actual rotational speed beyond the new desired rotational speed. This over-shooting results from an excess torque of the engine compared to the torque desired at the transmission input at the instant, in which the engine actual rotational speed has reached the new desired value.

The acceleration or revving up of the engine is effected by adjustment of the transmission ratio into the short range (transmission input rotational speed >> output rotational speed). If the engine rotational speed has reached its desired value, then the transmission ratio is again adjusted into a longer range.

The acceleration or revving up of the engine can thereby take place in an uncontrolled manner because the transmission cannot be adjusted so rapidly that the rotational speed-overshooting is avoided. With a rapid reaction of the transmission control to the overshoot rotational speeds, the engine is strongly decelerated to the desired rotational speed; a steep torque increase at the transmission output takes place thereby by reason of the reduction of the kinetic engine energy, which similar to a shifting jerk or jolt in automatic change-speed transmissions becomes effective in a negative manner for the driving comfort.

Other disadvantages of the rotational speed overshoot are a high noise emission, an unnecessary increased fuel consumption as well as power output collapses in diesel engines when reaching the down-regulating curve.

The DE-OS No. 35 04 763 teaches that the adjustment of the transmission ratio is to take place rapidly with a large desired-actual rotational speed deviation and is to take place more slowly when the deviation becomes smaller; however, this prior art disclosure contains no indication in what direction the adjustment is to be made and how the adjusting velocity will be controlled.

An arrangement for the regulation of the actuating force of a shifting member in automatically shifted change-speed transmissions is known from the DE-PS No. 21 24 024, which has the task, when shifting-up the change-speed transmission, to minimize the shifting periods, temperature increases and load of the force-locking friction elements with smallest possible shifting jerk.

The regulating magnitude in this arrangement is a difference of the actual value of the change per time of the transmission input rotational speed or engine rotational speed and of a desired value which depends on different measuring magnitudes (engine torque, transmission output rotational speed, vehicle load, transmission temperature, transmission ratio of engaged speed).

This desired or specified value is not equally large for all shifting operations even though it depends from some measuring magnitudes which are constant for short periods of time (temperature, load), but it always has a certain value differing from zero. This is also the case when according to a simplified proposed control modification, it is determined exclusively from the engine rotational speed at the beginning of the shifting-up operation—the desired value is then constantly free of variable influencing magnitudes and for the entire shifting operation.

This prior art arrangement is neither provided nor utilizable for the deliberate guidance of the engine rotational speed to a value specified by the drive pedal. Added thereto is the fact that differing from stepless transmissions, larger engine rotational speed band widths must be covered by change-speed transmissions with an unchanged transmission ratio, i.e., shifting or transmission ratio change operations cannot take place with every change of the drive pedal setting.

It is the object of the present invention to so improve the method applied by the arrangement of the aforementioned type that an overshooting of the engine rotational speed is prevented after reaching a changed desired rotational speed value while maintaining a high driving comfort, and to provide an arrangement for carrying out the method in accordance with the present invention.

The underlying problems are solved according to the present invention in that in the method according to the present invention, values representing the desired rate of change of engine rotational speed for the change per time of the engine rotational speed are unequivocally determined by means of at least one stored characteristic curve as a function of the difference of the desired and actual rotational speed values and are compared with determined values representing the actual rate of change of engine rotational speed and in that differences of the values representing the desired rate of change of engine rotational speed and actual values are fed to a controller as regulating deviations whose adjusting magnitude acts upon the adjusting mechanism for the control of the velocity of the change of the transmission ratio. With an apparatus according to the present invention, the signals representing the difference between the desired and actual engine rotational speed are fed to a signal input of a characteristic curve memory in the control apparatus, in the output of which desired rate of change of engine rotational speed signals coordinated to each rotational speed difference are present for the guidance of the change per time of the engine rotational speed with the change of the effective transmission ratio, in that the actual rotational speed signals are fed to a differentiating element for the formation of actual rotational speed change signals per time, and in that the desired and the actual rate of change of engine rotational speed signals are fed to a subtracting stage for the formation of the regulating deviation signals to be fed to the controller.

An uncontrolled speeding up (revving up) of the engine rotational speed during the adjustment of the transmission ratio is forcibly avoided by the specification of desired change values of the engine rotational speed in that that the difference between the desired and actual rotational speed is no longer used, but rather the difference between the specified and the actual change per unit time of the engine rotational speed, i.e., a difference of acceleration or deceleration values is used as regulating deviation and is fed to a controller.

The specification of the engine acceleration thereby takes place advantageously along a linear or non-linear characteristic curve which is plotted along a rotational speed axis or a desired-actual-rotational speed difference axis and intersects the former in the respective desired rotational speed point or the latter in its zero point.

A steady development of the desired rate of change of engine rotational speed thus results which has the value of zero exactly at the point of coincidence between desired and actual rotational speed. Comfortable transitions between individual engine rotational speed values are assured thereby.

Furthermore, either only the desired rotational speed specification by the drive pedal can be influenced or also an engine acceleration-specification characteristic line which corresponds to the drive range characteristic can be determined by means of a drive range selector switch which can preselect several forward driving ranges, for example,—"sporty, normal, consumption-optimized".

If in a vehicle with stepless transmission the drive pedal and the power output regulating device of the engine, i.e., for example, the throttle valve in the suction channel or the control rack of the diesel injection pump, are mechanically decoupled and the power output control device is controllable by way of an adjusting member from an engine performance graph memory (memory containing a set of engine characteristic curves), the engine torque can be raised in the case of application with the method according to the present invention by an engine load increase independent of the drive pedal if a higher desired rotational speed is demanded in the low rotational speed operation optimized for consumption. By the guidance of the engine acceleration along the specified characteristic curve, the engine then also cannot speed up (rev up) in an uncontrolled manner while the transmission ratio is adjusted for the acceleration of the vehicle. A possible torque collapse in the transmission output is thus compensated.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
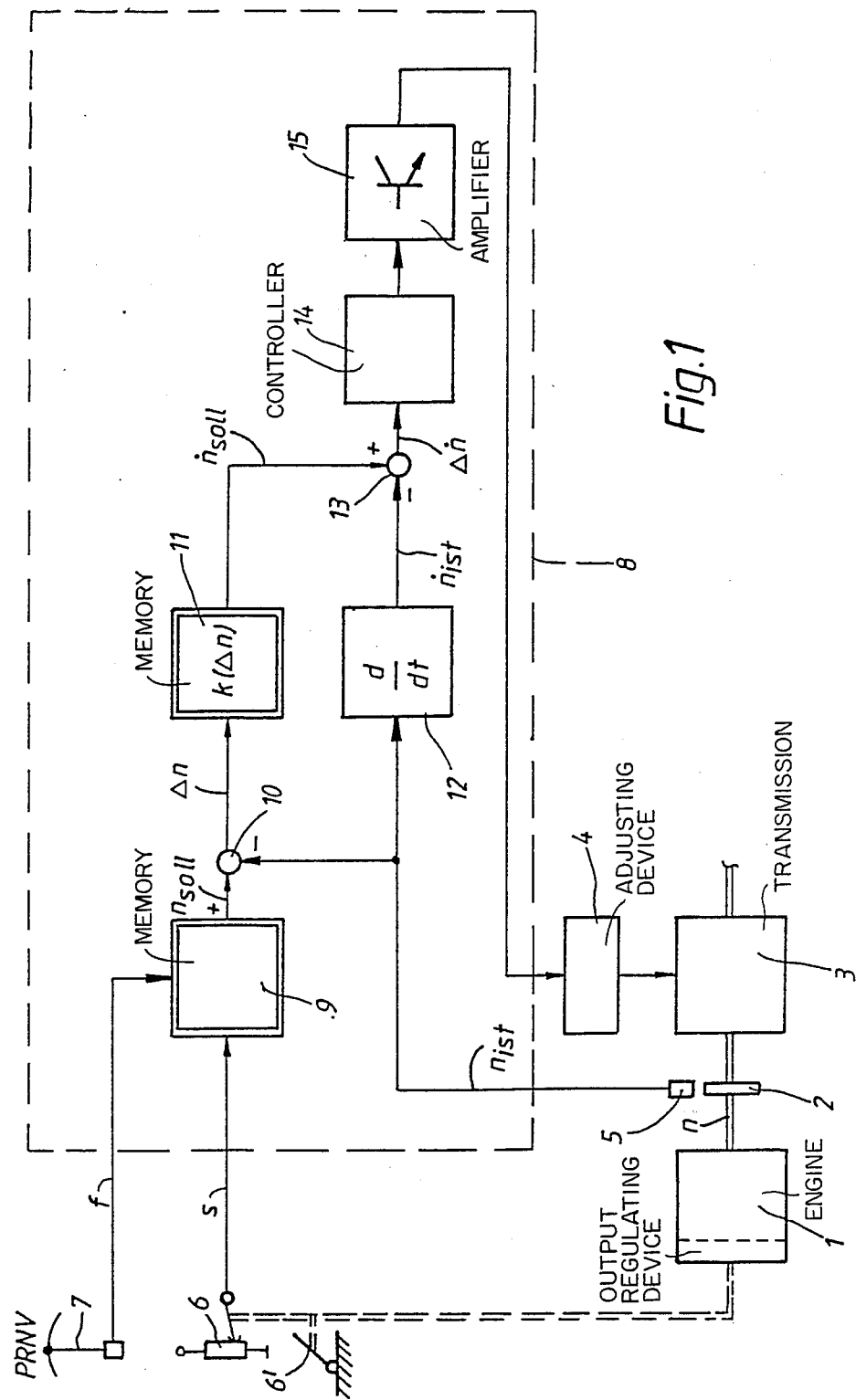
FIG. 1 is a block diagram of a first embodiment of a control arrangement according to the present invention.

Referring now to the drawing wherein like reference numerals are used throughout the various views to designate like parts, an internal combustion engine 1 having a flywheel 2 drives by way of a stepless or continuously variable transmission 3 a drive axle (not illustrated in detail) of a motor vehicle. The transmission rate of the stepless transmission 3 is changed or adjusted anew by a cone disk-adjusting device 4 in case of a desired-actual-engine rotational speed difference.

A rotational speed pick-up or transmitter 5 is arranged at the flywheel 2 and detects thereat the engine rotational speed n which, during the driving operation with the engine engaged to the transmission, is equal to the transmission input rotational speed, in actual rotational speed signals $n_{ist}$.

A drive pedal position transmitter 6 supplies drive pedal position signals s corresponding to the respective position of a drive pedal 6' mechanically adjusting the power output regulating device of the engine 1.

A transmitter is also provided at a drive range selector switch 7 which produces drive range selector signals f.

The actual rotational speed signals $n_{ist}$, the drive pedal position signals s and the drive range selector signal f are fed to an electronic control apparatus 8.

The two latter signals s and f are present in the control apparatus 8 at the inputs of a memory 9 for operating characteristic curves. Nonlinear characteristic curves are stored in the memory 9 from which desired rotational speed signals $n_{soll}$ for the engine 1 are read out in dependence on the drive pedal position signal s and the drive range selector signals f and are conducted to the signal output of the operating characteristic curve memory 9.

These desired rotational speed signals $n_{soll}$ are processed together with the actual rotational speed signals $n_{ist}$ in a subtracting stage 10 by the difference formation into desired-actual-rotational speed difference signals $\Delta n = n_{soll} - n_{ist}$. The rotational speed difference signals $\Delta n$ are fed to a characteristic curve memory 11. The latter contains a characteristic curve $k(\Delta n)$ from which desired rate of change of engine rotational speed signals $\dot{n}_{soll}$ for the change per time of the engine rotational speed n are read out dependent on the rotational speed difference signals Δn and are conducted to the signal output of the characteristic curve memory 11.

The actual rotational speed signals $n_{ist}$, in addition to being fed to the subtracting stage 10, are also fed to a differentiating element 12, in the output of which exist the actual rate of change of engine rotational speed signals $$\dot{n}_{ist} = d/dt\, n_{ist}$$

corresponding to the actual change per time of the engine rotational speed n.

The signal output of the characteristic curve memory 11 and the output of the differentiating element 12 are each connected to an input of a further subtracting stage 13. The latter forms from the desired and the actual rate of change of rotational speed change signals regulation deviation signals $\Delta\dot{n} = \dot{n}_{soll} - \dot{n}_{ist}$ and feeds the same to a controller 14.

An amplifier 15 is connected in the output of the controller 14 which amplifies the adjusting magnitude upon the cone disk adjusting device 4 of the stepless transmission 3.

Figure 2:
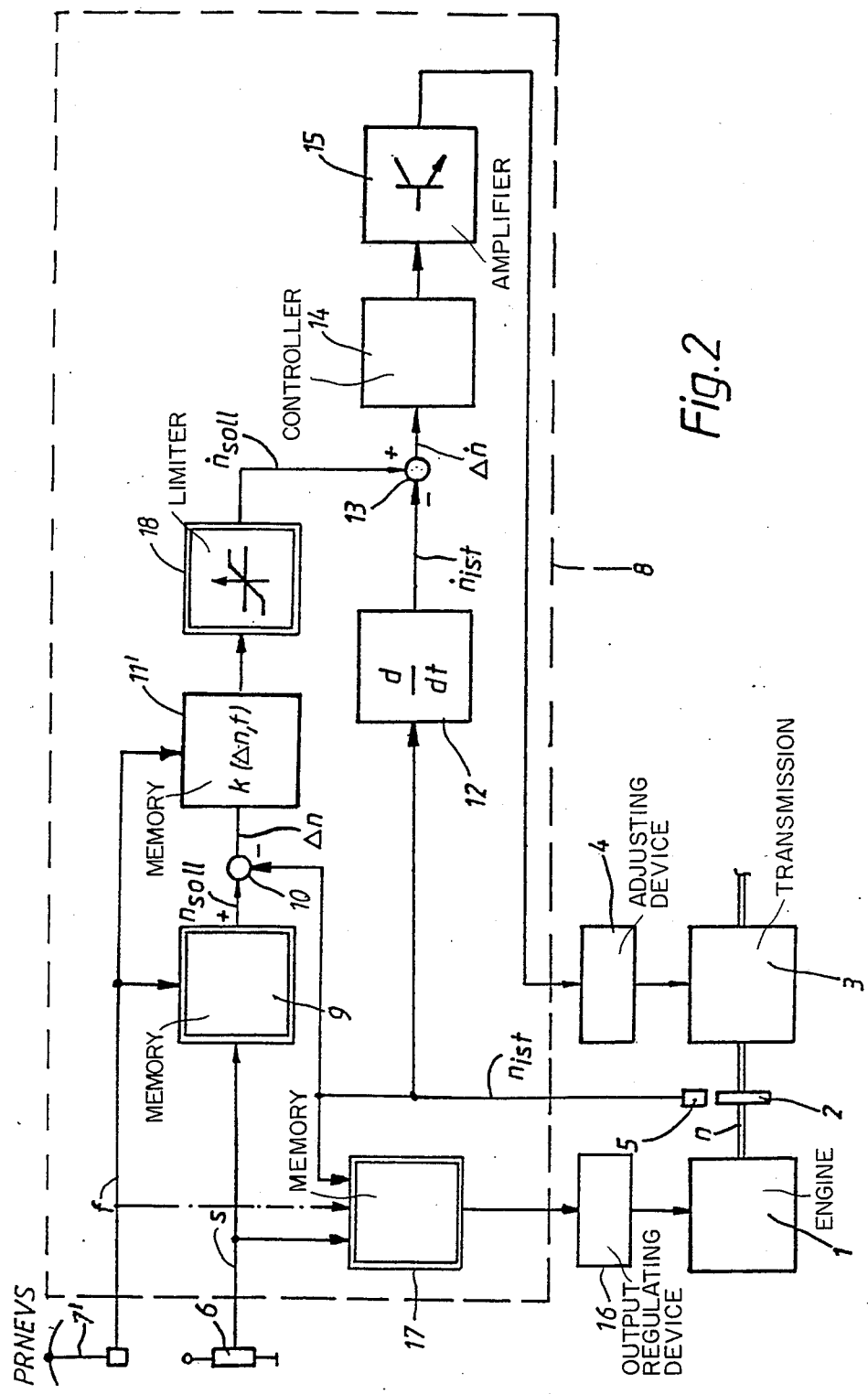
FIG. 2 is a block diagram of a modified embodiment of a control arrangement in accordance with the present invention.

A modified embodiment of the arrangement having a few additional components and functions is illustrated in FIG. 2.

The power output control device of the combustion engine 1 is now mechanically separated from the drive pedal (no longer illustrated) and is actuated by an adjusting drive 16. The drive pedal position signals s of the drive pedal position transmitter 6 and the actual rotational speed signals of the rotational speed transmitter 5 are fed to an engine characteristic curve memory 17; an adjusting magnitude for the adjusting drive 16 of the power output control device is present in its signal output.

In case of need, also the drive range selector signals f of the drive range selector switch 7' make available several forward driving ranges for example, E=consumption optimized ("Economy"), V=normal driving range, S=sporty, in addition to the parking, reverse and neutral driving stages —P, R, N—can be fed as additional input signals to the engine characteristic curve memory 17 by way of the connection indicated in dash-and-dotted line so that also the selected drive range has an influence on the adjusting magnitude for the adjusting drive 16 of the power output control device.

The set of characteristic curves of the engine characteristic curve memory 17 contains a characteristic for raising the engine torque at a drive pedal position s corresponding to a low actual rotational speed n and high desired rotational speeds $n_{soll}$.

The drive range selector signals f are additionally fed not only to the engine characteristic curve memory 9, but also to the characteristic curve memory 11' containing linear characteristic curves k (Δn, f). Thus, with different drive pedal position signals s, different desired rotational speed signals $\dot{n}_{soll}$ can be specified again from the characteristic curves k (Δn, f) coordinated to a drive range selecting signal f.

As the linear characteristic curves with constant slope would specify excessively large rotational speed change signals $\dot{n}_{soll}$ at large desired-actual-rotational speed difference signals Δn, a signal limiter 18 is connected in the output of the characteristic curve memory 11' which limits the rotational speed change signal $\dot{n}_{soll}$ to a constant maximum value beginning with a certain amount.

Figure 3:
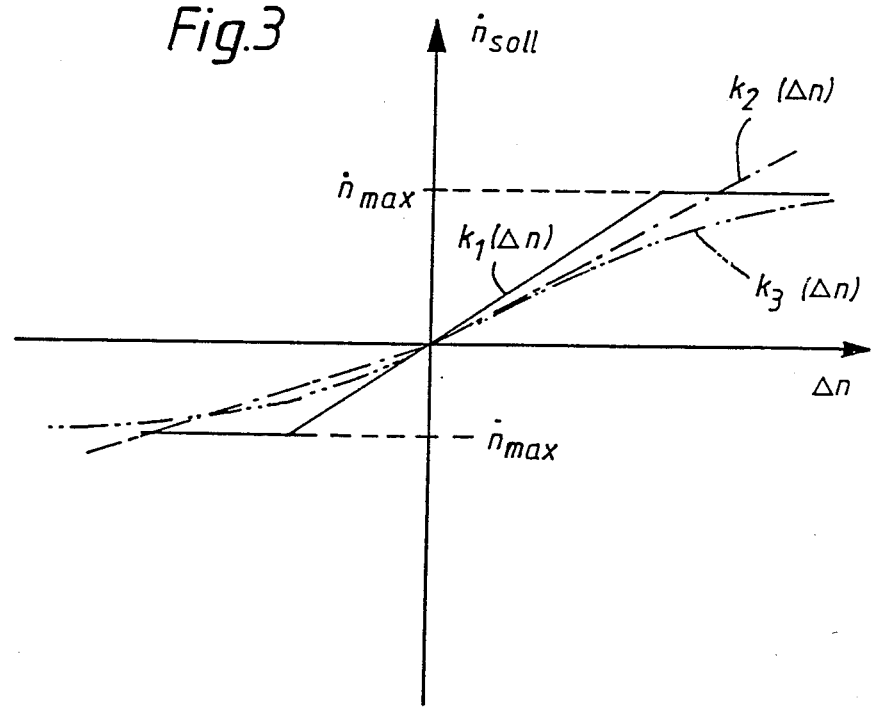
FIG. 3 is a diagram of desired rate of change of engine rotational speed characteristic curves in a coordinate system according to the present invention.
Figure 4:
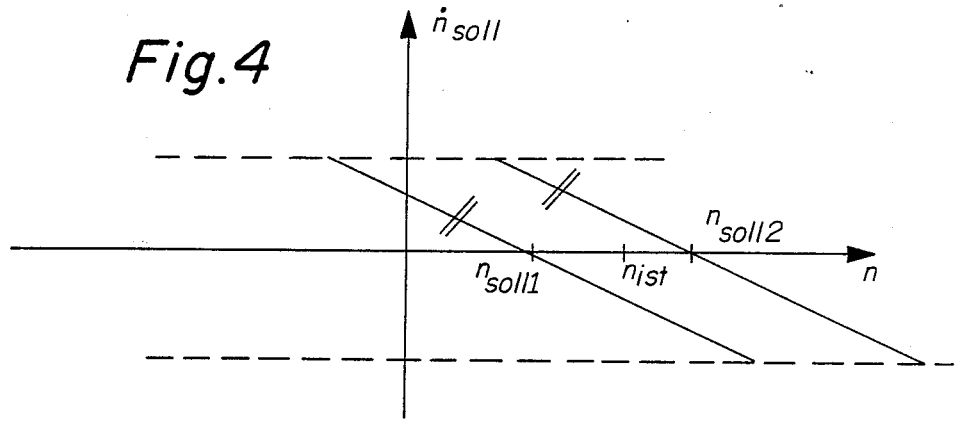
FIG. 4 is a diagram of desired rate of change of engine rotational speed characteristic curves similar to that shown in FIG. 3 as a function of actual engine rotational speed in accordance to the present invention.

In FIG. 3, three different types of characteristic curves k (Δn) for the rate of change of engine rotational speed signals $\dot{n}_{soll}$ in dependence on the magnitude of the difference between the desired and actual engine rotational speed signals $\Delta n = n_{soll} - n_{ist}$ are qualitatively illustrated.

A positive $\dot{n}_{soll}$ always corresponds to a positive Δn, i.e., the combustion engine is accelerated to a higher rotational speed. For decelerating the engine from a higher actual rotational speed value to a lower desired rotational speed value, a negative rate of change of engine rotational speed signal $\dot{n}_{soll}$ is correspondingly specified.

If the desired-actual-rotational speed difference Δn disappears, then no rotational speed change signal is specified any longer from all characteristic curves k (Δn), whereby the approach to the zero specification proceeds in a steady and continuous manner.

The characteristic curve $k_1$ (Δn) illustrated in full line, correspond to the arrangement according to FIG. 2 in which the desired rate of change of engine rotational speed signals $n_{soll}$ specified from the linear characteristic curve is to be kept constant by the signal limiter 18 beginning with threshold values $\dot{n}_{max}$ and $-\dot{n}_{max}$. —different in the positive and negative range.

The characteristic curve $k_2$ (Δn), illustrated in dash-and-dotted lines, is composed of two linear partial sections and has a lesser slope for the deceleration specifications than for acceleration specifications. The engine rotational speed can therefore be more rapidly accelerated than decelerated with the same desired-actual-rotational speed difference value.

Finally, a non-linear characteristic curve $k_3$ (Δn), shown in dash-and-double-dot line, is indicated in FIG. 3 which adjoins asymptotically the threshold values $\dot{n}_{max}$, $-\dot{n}_{max}$ of the signal limiter 18 with larger values representing the difference between the desired and actual engine rotational speed.

A relation between drive range selector signals f and characteristic curves k (Δn, f) is not illustrated but can be realized in a simple manner by a parametric superposition of the drive range selector signals f to a set of linear characteristic curves k (Δn, f) with respective different slopes, whereby the number of the characteristic curves k ( Δn, f) can be smaller than or equal to the number of selectable pre-selection ranges. One characteristic curve for two forward drive ranges, for example, "E" and "V", and a steeper characteristic curve for the drive range "S" may be stored without any problem whereas no special characteristic curve is likely to be required, inter alia, for the reverse drive range.

The use of the method according to the present invention by the arrangement in accordance with the present invention provides the measurement of the engine rotational speed as actual rotational speed signal and the comparison thereof with a desired rotational speed signal specified per drive pedal. In case of deviations between the desired and the actual rotational speed signal, a desired rate of change of engine rotational speed signal is specified from a characteristic curve which, in its turn, is compared with an actual rotational speed change signal.

The result of the comparison is the regulating deviation signal which is fed to the controller. The latter controls the transmission-adjusting device in order to decrease the regulating deviation.

The engine approaches the specified desired rotational speed with specified acceleration/deceleration by the transmission adjustment so that the desired-actual-rotational speed difference approaches zero. On the basis of the characteristic of the characteristic curves of the rate of change of engine rotational speed specification, the desired rate of change of engine rotational speed signal is at the same time continuously decreased, with which the actual rate of change of engine rotational speed is matched by the controller.

Shortly before the point in time of agreement between desired and actual rotational speed, the actual rate of change of rotational speed of the engine has therefore already become very small. At the point of time of agreement or coincidence, it becomes equal to zero, as a result of which the new rotational speed value is established stationary without overshooting and with smooth transition.

The method according to the present invention can be realized in every motor vehicle with conical disk belt transmissions (passenger motor vehicle, commercial vehicles, trucks) with low expenditures from a measurement-technical point of view because only a drive pedal transmitter—which can also be attached at the carburetor or at the injection pump linkage—and a rotational speed transmitter are essential to the functioning.

Eventual slippage losses between flywheel and transmission input shaft in a fluid coupling can, of course, be compensated in a known manner also on the basis of measurement techniques during the formation of the actual rotational speed signals.

Even though a conical disk belt transmission in a motor vehicle with internal combustion engine is described in connection with the embodiment, the method and apparatus according to the present invention is utilizable, of course, also for other types of constructions of steplessly adjustable or continuously variable transmissions (hydrostatic transmissions, friction gear transmissions, etc.).

The method and apparatus in accordance with the present invention is also utilizable in other types of vehicles, for example, rail vehicles, with stepless transmissions and for other types of drives, for example, electric motors with selectively influenceable desired engine rotational speed specification, which cooperate with a stepless transmission, by corresponding modifications as known to a person skilled in the art.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intended to cover all such changes and modifications as are encompassed by the scope of the appended claims.

We claim:

1. A method for controlling a continuously a continuously variable transmission ratio of a continuously variable transmission wherein values representing desired engine rotational speed produced in dependence on a position of a drive pedal of a driving engine control an engine output regulating device and are continuously compared with values representing measured, actual engine rotational speed and in dependence on the magnitude of the difference between the values of desired and actual engine rotational speed, a rapid change of transmission ratio is effected for a large difference and a slower change of transmission ratio is effected as the difference between measured and desired engine rotational speed diminishes such that the change in transmission ratio is terminated when the actual and desired engine rotation speeds are substantially equal, said method comprising the steps of:
    (a) determining a desired rate of change of engine rotational speed from a memory having a predetermined stored values which provide a desired rate of change of engine rotational speed as a function of the magnitude of the difference between desired and actual engine rotational speed;
    (b) comparing actual rate of change of engine rotational speed with desired rate of change of engine rotational speed; and
    (c) providing a control signal as a function of the difference between the desired rate of change and actual rate of change of engine rotational speed to a controller for receiving the control signal and for controlling an adjusting device for adjusting the rate of change of the transmission ratio in response thereto.

2. A method according to claim 1, wherein different forward drive ranges are selected to vary operational output characteristics of the transmission, said method further comprising the step of:
    (d) determining the desired engine rotational speed as a function of both the drive pedal position and a selected forward drive range.

3. A method according to claim 1, wherein available engine torque is controlled by an adjustment of the engine output regulation device, said method further comprising:
    (d) decoupling control of the engine output regulating device from the engine drive pedal at low actual engine rotational speed and high desired engine rotational speed demands; and
    (e) raising the available torque of the driving engine to compensate for a brief torque collapse of the transmission output resulting from a rapid change of transmission ratio by adjusting the output regulating device.

4. A method according to claim 1, wherein the functional relationship between the desired rate of change of engine rotational speed and the actual rate of change of engine rotational speed is different during acceleration and deceleration of the engine.

5. A method according to claim 1 wherein different forward drive ranges are selected to vary operational output characteristics of the transmission, and wherein step (a) comprises:
    determining one of a plurality of desired rates of change of engine rotational speed from a memory having a plurality of sets of stored values which each provide a desired rate of change of engine rotational speed as a function of the magnitude of the difference between desired and actual engine rotational speed in response to a selection of one of the different forward drive ranges which also determines one of said sets of stored values to be used in determining a desired rate of change of engine rotational speed.

6. A method for controlling a continuously variable transmission ratio of a continuously variable transmission wherein values representing desired engine rotational speed produced in dependence on a position of a drive pedal of a driving engine control an engine output regulating device and are continuously compared with values representing measured, actual engine rotational speed and in dependence on the magnitude of the difference between the values of desired and actual engine rotational speed, a rapid change of transmission ratio is effected for a large difference and a slower change of transmission ratio is effected as the difference between measured and desired engine rotational speed diminishes such that the change in transmission ratio is terminated when the actual and desired engine rotation speeds are substantially equal, said method comprising the steps of:

(a) determining a desired rate of change of engine rotational speed from a memory having predetermined stored values which provide a desired rate of change of engine rotational speed as a function of the actual engine rotational speed;

(b) comparing actual rate of change of engine rotational speed with desired rate of change of engine rotational speed; and (c) providing a control signal as a function of the difference between the desired rate of change and actual rate of change of engine rotational speed to a controller for receiving the control signal and for controlling an adjusting device of adjusting the rate of change of the transmission ratio in response thereto.

7. A method according to claim 6, wherein the functional relationship between the desired rate of change of engine rotational speed and actual engine rotational speed is different during acceleration and deceleration of the engine.

8. A method according to claim 7 wherein the functional relationship between the desired rate of change of engine rotational speed and the actual engine rotational speed is linear and limited to a maximum value when large deviations exist between actual and desired engine rotational speed.

9. A method according to claim 7, wherein step (a) further comprises determining one of a plurality of desired rates of change of engine rotational speed from a memory having a plurality of sets of stored values which each provide a desired rate of change of engine rotational speed as a function of actual rotational speed in response to a selection of one of a variety of forward drive ranges for varying a operational characteristics of the transmission and for determine the set of stored values to be used in determining a desired rate of change of engine rotational speed.

10. A method according to claim 6, wherein the functional relationship between the desired rate of change of engine rotational speed and the actual engine rotational speed is linear and limited to a maximum value for large deviations between actual and desired engine rotational speed.

11. An apparatus for controlling a continuously variable transmission ratio of a continuously variable transmission in a motor vehicle having a driving engine and further comprising:

(a) a drive pedal, a position of which determines a desired engine rotation speed;

(b) engine power output regulating means for regulating the power output of the engine in response to a position of the drive pedal;

(c) means for determining the actual engine rotational speed;

(d) first memory means for determining a desired rate of change of engine rotational speed from predetermined stored values which provide a desired rate of change of engine rotational speed as a function of the magnitude of the difference between desired and actual engine rotational speed;

(e) means for determining actual rate of change of engine rotational speed;

(f) comparing means for comparing actual rate of change of engine rotational speed with desired rate of change of engine rotational speed;

(g) control means for producing a control signal as a function of the magnitude between the actual and desired rate of change of engine rotation speed;

(h) adjustment means for receiving the control signal and adjusting the rate of change of the transmission ratio in response thereto wherein a rapid change of transmission ratio is effected for large deviations between the desired rotational engine speed and actual engine rotational speed and a slower change is effected as the difference between actual rotational engine speed and desired rotational speed diminishes such that the change in transmission ratio is terminated when the actual and desired engine rotational speeds are substantially equal.

12. An apparatus according to claim 11, wherein:

(a) the drive pedal is provided with a drive pedal position transmitter for providing a signal representative of a position of the drive pedal;

(b) the actual engine rotation speed determining means includes a signal transmitter for providing a signal representative of the actual engine rotational speed;

(c) the control means is an electronic circuit having a differentiating element for receiving the actual engine rotational speed signal and providing an output signal representing the actual rate of change of engine rotational speed as well as having a second memory means for receiving the drive pedal position signal and providing a desired engine rotational speed signal as a function thereof which is subtracted from the actual engine rotational speed signal to produce a speed difference signal;

(d) the first memory means providing a desired rate of change of engine rotational speed signal in response to a speed difference signal; and (e) the control means further having means for receiving the desired rate of change of engine rotational speed signal from which the actual rate of change of engine rotational speed signal is subtracted to produce the control signal.

13. An apparatus according to claim 12, further comprising:

(a) drive range selection means for selecting one of a plurality of different forward drive ranges and for providing an output signal representative of a selected drive range;

(b) third memory means for receiving the drive range selection signal and the drive pedal position signal and for providing an output signal which is employed as a desired engine rotational speed signal as a function of both the drive range selection and the drive pedal position signals.

14. An apparatus according to claim 13, wherein the functional relationship between the speed difference signal and the desired rate of change of engine rotational speed signal is linear such that the desired rate of change of engine rotational speed signal goes to zero as the speed difference signal goes to zero.

15. An apparatus according to claim 14, further comprising a signal limiter connected to the output of the second memory meanns for limiting the magnitude of the desired rate of change of engine rotational speed signal to a maximum constant predetermined value.

16. An apparatus according to claim 13, wherein the functional relationship between the speed difference signal and the desired rate of change of engine rotational speed signal is non-linear such that the desired rate of change of engine rotational speed signal goes to zero as the speed difference signal goes to zero.

17. An apparatus according to claim 13, wherein the first memory means is provided with an input for receiving the drive range selection signal and has a plurality of sets of predetermined stored values which each provide a desired rate of change of engine rotational speed as a function of the speed difference signal, a set of predetermined stored values to be used being determined by the drive range selection signal and a desired rate of change of engine rotational speed signal being generated as a function of both a speed difference signal and a drive range selection signal.

18. An apparatus according to claim 12, wherein said second memory means provides a desired engine torque of the driving engine to compensate for a brief torque collapse of the transmission output resulting from a rapid change of transmission, independent of the pedal position signal, at low actual engine rotational speeds and high desired engine rotational speed demands.

19. An apparatus according to claim 12, wherein the functional relationship between the speed difference signal and the desired rate of change of engine rotational speed signal is linear such that the desired rate of change of engine rotational speed signaal goes to zero as the speed difference signal goes to zero.

20. An apparatus according to claim 12, further comprising a signal limiter connected to the output of the second memory means for limiting the magnitude of the desired rate of change of engine rotational speed signal to a maximum constant predetermined value.

21. An apparatus according to claim 12, wherein the functional relationship between the speed difference signal and the desired rate of change of engine rotational speed is non-linear such that the desired rate of change of engine rotational speed signal goes to zero as the speed difference signal goes to zero.

22. An apparatus according to claim 12, further comprising:
(a) drive range selection means for selecting one of a plurality of different forward drive ranges and for providing an output signal representative of the selected drive range; and
(b) first memory means having an input for receiving the drive range selection signal and further having a plurality of sets of predetermined stored values, each set providing a desired rate of change of engine rotational speed as a function of a speed difference signal, a set of predetermined stored values to be used being determined by the drive range selection signal, a desired rate of change of engine rotational speed signal being generated as a function of both a speed difference signal and a drive range selection signal.

* * * * *